May 17, 1938.  V. L. COBB  2,117,401

VEHICLE SPRING SUSPENSION

Filed Oct. 4, 1937

INVENTOR.
V. L. Cobb.
BY Martin E. Anderson
ATTORNEY.

Patented May 17, 1938

2,117,401

UNITED STATES PATENT OFFICE 2,117,401

VEHICLE SPRING SUSPENSION

Vernor L. Cobb, Hugo, Colo.

Application October 4, 1937, Serial No. 167,198

1 Claim. (Cl. 267—19)

This invention relates to resilient vehicle supports and has reference more particularly to a chassis or resilient supports for automobile trailers.

Automobile trailers of various kinds are becoming increasingly popular and this is true more particularly with respect to the house type. This type is somewhat top heavy and if supported by the usual spring and axle arrangement the trailer will develop a dangerous side sway or rocking movement when traveling over uneven highways. Since trailers are usually supported by a single axle and one pair of wheels, it is evident that if each wheel can move up and down independently, as it can when a straight solid axle connects the wheels and is connected near each end with the chassis frame by a spring. Such a construction permits the body to rock about a longitudinal axis and to sway dangerously. This objectionable feature is still further accentuated if independent wheel action of the type known as "knee action" is employed.

It is the object of this invention to produce a resilient mounting for trailers that will inhibit to the greatest extent practical the rocking of the body and to effect this a support has been deviced in which both sides move towards and away from the axis of the supporting wheels equally and simultaneously so that the plane of the floor or of the chassis frame always remains parallel with the axis of the supporting wheels.

This invention, briefly described, consists in a chassis frame having spaced parallel side members, connected by suitable transverse members. A shaft having a straight central portion and offset ends, extends transversely of the frame and is journaled in bearings in the side frame members. The supporting wheels are attached to wheel axle journals connected with the laterally offset ends of the shaft and the weight of the frame is supported from the wheel axles by means of springs, when the springs flex the frame moves towards or away from the axis of the supporting wheels, but is always parallel with this axis and the frame and the body supported thereby can therefore not rock or sway transversely with respect to the axis of the supporting wheels.

Having thus briefly described the invention, the same will now be described in detail and for this purpose reference will be had to the accompanying drawing in which the invention has been illustrated and in which.

Figure 1:
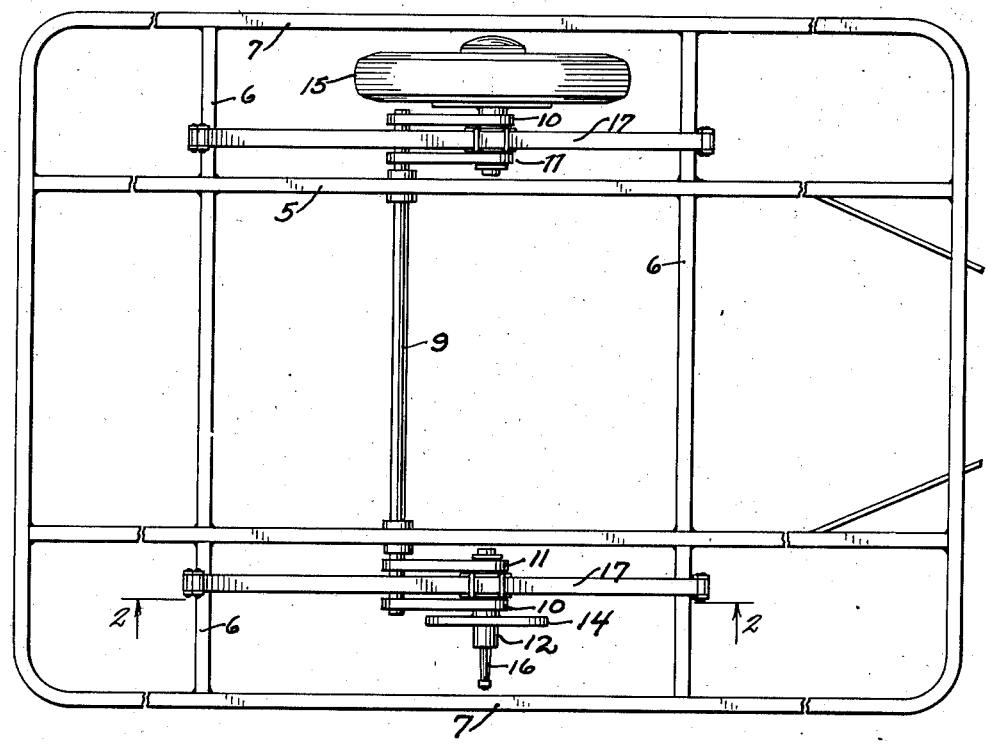
Figure 1 is a top plan view of a trailer chassis frame constructed in accordance with this invention.
Figure 2:
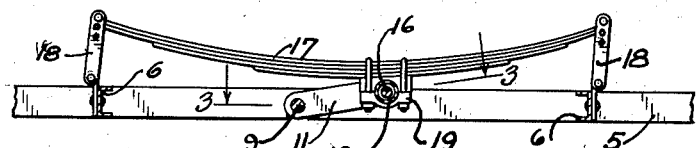
Figure 2 is a section taken on line 2—2 Fig. 1.
Figure 3:
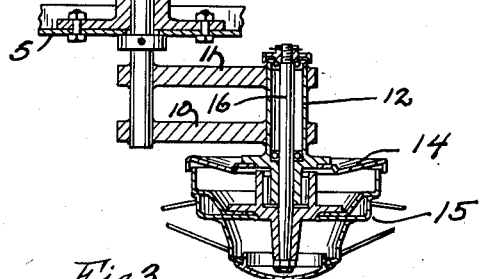
Figure 3 is a section taken on line 3—3 Fig. 2.

The chassis frame shown in the drawing has two spaced, parallel side members 5 that are connected by transverse members 6 which project beyond the outside of the side members. The frame is surrounded by a continuous frame member 7. The side members 5 have bearings 8 attached at corresponding opposed points and a straight shaft 9 is journaled in these bearings. Welded to the ends of shaft 9 are two pairs of crank arms 10 and 11. These arms extend in the same direction and lie in a plane that contains the axis of shaft 9. Arms 10 and 11 have openings through which the tubular axle housings 12 extend and to which they are welded.

The housings 12 are provided with brake disks 14 and the ends that project beyond these disks serve as journals for the wheels that have been designated by numerals 15. The wheels are held in place by means of short shafts 16 that correspond to the drive shafts of an automobile. The manner in which the wheels are attached to the housings 12 corresponds to what is known as a "full floating rear axle", but as this has nothing to do with the invention that forms the subject of this application the showing has been made more or less diagrammatic and will not be further described.

The axes of the housings 12 are in alignment and are coplanar with the axis of the straight portion of the shaft 9. The two housings 12 may be considered as cranks and since they are welded to the ends of the shaft they cannot rotate relative to each other without twisting the shaft.

A semi-elliptical spring 17 is provided on each side of the frame and is attached at its ends, to the transverse frame members 6 by means of adjustable shackles 18. Secured to the under side of each spring is a bearing 19 that may be made in two parts as shown, and in which are journaled the shaft housings 12. It is evident from the above that the weight of the chassis, and load carried thereon, is transmitted to the wheels through the bearings 19 and the housings 12 and since the latter are in effect integral with the shaft 9, the chassis frame will have to move equal distances on both sides, or in other words, it will be constrained to move in such a way that it will always be parallel with the common axis of the supporting wheels. If the two wheels could rotate independently about the axis of shaft 9, then one side of the frame could move up and down independently of the other side and the trailer would rock and sway when travelling over a rough road.

The arms 10 and 11 are made strong and rigid so that they will withstand such torsional strains as may develop when the trailer is in use.

By lengthening or shortening the shackles the distance of the body can be adjusted with respect to the road. The length of the arms 10 and 11 determine the extent of the vertical adjustment which, of course, must be such that the chassis has the necessary clearance.

Since the housings 12 form in effect a continuous axle and move in the arc of a circle whose center is the center of shaft 9, it is evident that the springs will have bodily movement in the direction of their length. This would be more apparent if the arms 10 and 11 were shown at a greater inclination. It is therefore essential that the bearings 19 and the springs 17 shall be mounted for longitudinal movement.

Although springs 17 have been shown as semi-elliptical, it is clear that other types of springs may be used.

The idea underlying this invention is to have the axles on which the wheels rotate coaxial and offset in the same direction and to the same extent from the main axle 9 and coplanar with the axis of the latter and the load supported resiliently on the axle housings 12 while the axle 9 is rotatably connected with the chassis frame.

Having described the invention what is claimed as new is—

A resilient support for a vehicle body, comprising in combination, a chassis frame having spaced parallel side members and spaced transverse members projecting beyond the side member, a semi-elliptical spring on each side of the frame, the springs being connected at their ends to the transverse members by means of shackles that permit the springs to move bodily in the direction of their length, a bearing secured to the under side of each spring, a bearing secured to each side member, and a shaft journaled for oscillation in the last mentioned bearings, the ends of the shaft being offset in the same direction and to the same amount to form wheel axles, the axes of the wheel axles being in alignment and coplanar with the axis of the shaft, the wheel axles being journalled in the bearings secured to the springs whereby when the springs are flexed the ends of the shaft will move in unison and to the same extent relative to the plane of the frame, the wheel axles having supporting wheels secured thereto.

VERNOR L. COBB.